United States Patent
Ito et al.

(10) Patent No.: US 6,251,299 B1
(45) Date of Patent: Jun. 26, 2001

(54) MAGNETIC MATERIAL, INDUCTANCE ELEMENT USING THE SAME AND MANUFACTURING METHOD THEREOF

(75) Inventors: Takashi Ito; Yukio Takahashi; Fumio Uchikoba, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/468,914

(22) Filed: Dec. 22, 1999

(30) Foreign Application Priority Data

Dec. 28, 1998 (JP) .................................................. 10-374045

(51) Int. Cl.$^7$ ................................ H01F 1/34; H01F 17/00
(52) U.S. Cl. ......................... 252/62.6; 264/611; 336/233
(58) Field of Search ........................... 252/62.6; 264/611; 336/233

(56) References Cited

U.S. PATENT DOCUMENTS 2,860,105 * 11/1958 Gorter et al. ........................ 252/62.6
2,989,476 * 6/1961 Eckert .................................. 252/62.6

FOREIGN PATENT DOCUMENTS

| 4-93006 | 3/1992 | (JP) . |
| 4-354314 | 12/1992 | (JP) . |
| 8-339913 | 12/1996 | (JP) . |

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

Magnetic material has a ceramics having a composition in the range of Fe2O3 35.0 to 44.5 mol %, NiO 47.0 to 56.5 mol % and CuO 5.0 to 12.0 mol %, and the ceramics having relative magnetic permeability of 15 or less, and composes the inductance element comprising this magnetic material and the internal metallic conductor. For making laminated inductance elements by concurrently baking ceramic green sheets and internal metallic conductors, substances to be used as ceramic green sheets, which substances have the composition in the above mentioned range are used, and a silver or silver alloys are used as the internal metallic conductor, and the calcination is carried out at temperature of 880 to 920° C.

6 Claims, 3 Drawing Sheets

MAGNETIC MATERIAL, INDUCTANCE ELEMENT USING THE SAME AND MANUFACTURING METHOD THEREOF

BACKGROUND OF THE INVENTION

The invention relates magnetic materials comprising ceramics enabling to be baked at relatively low temperatures, inductance elements using the same, and a making method thereof.

In general, magnetic materials (ferrite) are ordinarily composed of iron oxide ($Fe_2O_3$) in a range of not exceeding 50 mol % and in a rate of considerably approximate thereto, e.g., 48 to 49.8 mol % and other metallic oxides, e.g., nickel oxide (NiO), copperoxide (CuO), zinc oxide (ZnO) and others of a little exceeding 50 mol % in total so as to be 100 mol % in the whole quantity. A known composition is $Fe_2O_3$ 49 mol %, NiO 21 mol %, CuO 10 mol % and ZnO 20 mol % (JP-A-4-354314). A composition point of iron oxide 50 mol % and other metallic oxides 50 mol % in total is called as "Stoichiometry", and if being greatly off from the vicinity of the composition point, surplus components are isolated to cause heterogeneous phases so that unexpected abnormalities of electromagnetic properties and porcelain properties happen, and therefore components should be selected in the vicinity of the stoichiometry.

However, in the vicinity of the stoichometry, if the above mentioned combinations are made, it is difficult to set a relative magnetic permeability $\mu i$ to be 15 or less, and if other elements are substituted, there are problems existing as unsolved that a sintering temperature increases, metals to be used as internal conductors are limited, or temperature characteristic of the relative permeability is markedly bad.

On the other hand, with respect to the magnetic materials, investigations are being made on decreasing the proportion of iron (Fe) than the stoichiometry, and a proposal of setting the iron oxide to be b elow 44.5 mol % has been made in regard to materials to be used to magnetic cores (JP-A-8-339913), and with respect to laminated inductance elements, a further proposal of decreasing iron oxide to be near 45 mol % has been made (JP-A-4-93006).

However, there has not yet been known such a magnetic material where the mol rate of the iron oxide is more lowered so as to s et the relative permeability to be below 15, and the firing is possible at relatively low temperature as 920° C. or less enabling to be co-fired with the internal silver conductor.

It is an object of the invention to provide such magnetic materials in which the relative magnetic permeability $\mu i$ is small, the firing temperature is around 900° C. enabling to be concurrently fired with the internal silver conductor, and a temperature changing rate of the relative magnetic permeability $\mu i$ is considerably small.

Inventors of this patent application have made various studies on compositions of magnetic materials, and discovered that even if the mol percentage of the iron oxide is lowered than the stoichiometry, a magnetic material having a lower relative permeability and a low calcination temperature property may be obtained unexpectedly, and based on this discovery they have made the invention.

That is to say, the magnetic material of the present invention includes a ceramics having the composition in the range of $Fe_2O_3$ 35.0 to 44.5 mol %, NiO 47.0 to 56.5 mol % and CuO 5.0 to 12.0 mol %, and having relative magnetic permeability of 15 or less; the inductance element comprising this magnetic material and the internal metallic conductor; and a method characterized by using, when making the laminated inductance elements by concurrently baking ceramic green sheets and internal metallic conductors, a substance to be used as the ceramic green sheet, which substance has the composition in the range of $Fe_2O_3$ 35.0 to 44.5 mol %, NiO 47.0 to 56.5 mol % and CuO 5.0 to 12.0 mol %, and using a silver or silver alloys as the internal metallic conductor, and carrying out the firing at temperature of 880 to 920° C.

DETAILED DESCRIPTION OF THE PREFERRED EMBODIMENTS

Figure 1:
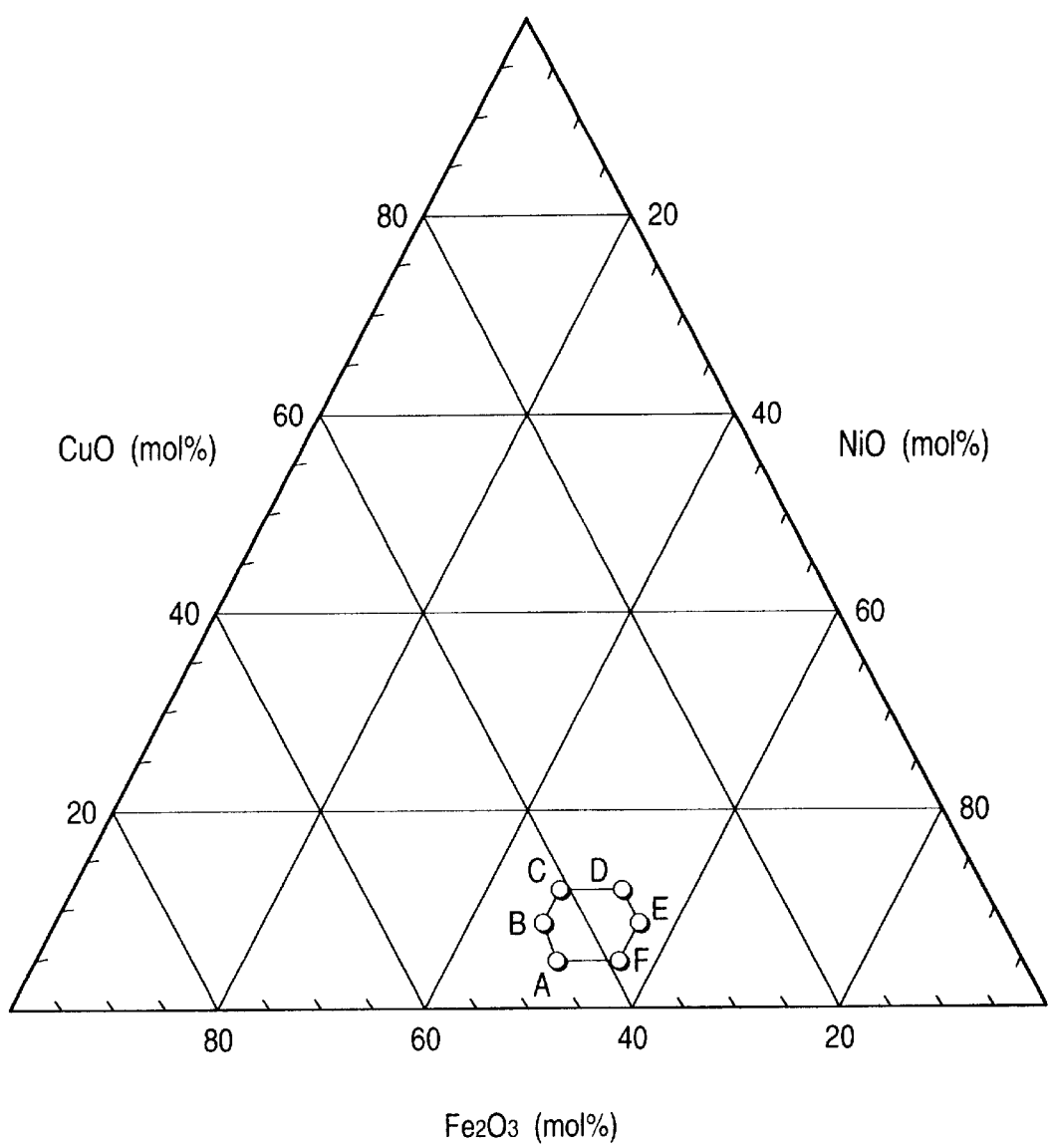
FIG. 1 is a triangle showing the composition of the magnetic material of the invention.

The inventive magnetic material comprises the iron oxide, nickel oxide and copper oxide, and when the mol percentages at calculating in terms of $Fe_2O_3$, NiO and CuO are shown a triangle having respective apexes of these components, the instant magnetic material has the composition within a range encircled with lines combining six points of A (44.5, 50.5, 5.0 mol %), B (44.5, 47.0, 8.5 mol %), C (41.0, 47.0, 12.0 mol %), D (35.0, 53.0, 12.0 mol %), E (35.0, 56.5, 8.5 mol % and F (38.5, 56.5, 5.0 mol %) and the composition on the lines combining the six points, namely, the composition within and on oblique lines of FIG. 1.

Being beyond the set amount of $Fe_2O_3$, the relative magnetic permeability $\mu i$ exceeds 15, and being beyond the set amount of CuO, the temperature changing rate of the inductance becomes large. In addition, decreasing the amount of $Fe_2O_3$ than the set amount and increasing the amount of NiO than that, the sintering is insufficient at temperatures of 880 to 920° C., and the density is lowered.

Next, the inventive magnetic material can be produced absolutely similarly to the conventionally existing methods of producing ordinary magnetic materials. That is, as starting materials, powders are used of oxides of metallic elements for composing desired magnetic materials, e.g., iron oxide, nickel oxide and copper oxide, or compounds enabling to generate their oxides by a thermal treatment, e.g., carbonate of corresponding metals, and are selected such that when percentages of the respective metal oxides are calculated in terms of $Fe_2O_3$, NiO and CuO, finally $Fe_2O_3$ is 35.0 to 44 mol %, NiO is 47.0 to 56.5 mol % and CuO is 5.0 to 12.0 mol %. For this procedure, the mixing percentages should be determined taking into consideration elements probably coming into the producing process of the materials as circumstances may be.

It is preferable that the powders of the starting materials are subjected to a wet-mixture by means of a ball mill, or a media convection mixing-crushing machine (handy mill). The thus produced mixture of powders is subsequently carried out with a temporary firing in an air at temperature of around 700° C. for 1 to 2 hours. And the temporarily fired material is pulverized into average diameter of around 0.5 to 2.0 $\mu m$ and relative surface area of 5 to 8 $m^2/g$ by the ball mill or the handy mill.

The temporarily fired powder is added with a binder, e.g., polyvinyl alcohol or acrylic resin to form in desired shapes, followed by a real firing at 880 to 920° C., preferably below 900° C. The firing time is ordinary about 2 hours.

In this way, the magnetic materials are available of the density being 5.00 g/cm³ or more, the relative permeability being 15 or less and the temperature changing rate of the inductance being ±5 or less.

For making the laminated inductance elements by using the inventive magnetic material, the temporarily fired powder is added with the binder and a vehicle containing an organic solvent so as to prepare a slurry for layers of a magnetic substance, and green sheets are made from the slurry, on which pastes of internal conductive layers are then laminated by a printing method or a sheet method, and are co-fired at the same time at the temperature of 880 to 920° C. The obtained laminated body is provided with electrodes in an ordinary manner. As the internal conductors, cheap metals of low melting points are used, for example, silver or silver alloys, nickel or nickel alloys, or aluminum or aluminum alloys, in particular, silver or silver alloys are preferable. As the silver or the silver alloys, there may be enumerated a simple silver, a silver-palladium alloy or silver-platinum alloy containing Ag 90 wt % or more.

In this manner, the laminated inductance elements are provided.

EXAMPLES

The invention will be explained in more detail referring to Examples.

Examples 1 to 5 and Comparative Examples 1 to 6

Fe2O3, NiO and Cuo were weighed by an electronic balance, and mixed at the mol corresponding amount shown in Table 1 after having amended purity of each raw material.

The components were wet-mixed with a solvent of a pure water by the handy mill to be a slurry, and the slurry was prepared to be about 30 wt % in the density. After mixing for 5 hours, the slurry was dried and temporarily fired for 2 hours in the air at the temperature of about 700° C.

Subsequently, the temporarily fired material was pulverized for 20 hours with the handy mill to be powders of about 8 m²/g in the specific surface area, and dried to turn out temporarily fired powders.

The temporarily fired powders were added with polyvinyl alcohol of 2 wt % and pressed with pressure of 2×10³ kg/cm² to be a toroidal shaped body of 10 mm diameter, 5 mm inner diameter and 5 mm height. Then, the shaped body was subjected to a real firing at 900° C. for 2 hours to produce the magnetic materials of average diameter being 0.8 to 5.0 μm. The toroidal of the magnetic material was coiled with a coating copper wire for measuring the magnetic property, and measured results are shown in Table 1.

The temperature changing rate of the inductance followed the reference of the temperature of 25° C., and deviations from the value of the inductance were shown with percentages.

TABLE 1

|  |  | Ratio of components (mol %) | | | Magnetic properties | | |
|---|---|---|---|---|---|---|---|
|  |  |  |  |  | Relative permeability | Density | Rate of change in inductance temperature |
| Examples | | Fe₂O₃ | NiO | CuO | ($\mu_1$) | (g/cm³) | (ΔL/L %) |
| I | 1 | 42.04 | 50.23 | 7.73 | 12 | 5.04 | +1.1~+4.7 |
|  | 2 | 39.41 | 52.15 | 8.44 | 10 | 5.02 | +0.2~+2.3 |
|  | 3 | 39.01 | 54.68 | 6.31 | 12 | 5.04 | +1.1~+4.1 |
|  | 4 | 37.10 | 53.84 | 9.06 | 10 | 5.03 | −0.1~+4.3 |
|  | 5 | 39.00 | 50.00 | 11.00 | 11 | 5.03 | +0.3~+3.3 |
| II | 1 | 48.70 | 47.20 | 4.10 | 23 | 5.07 | −3.2~+2.7 |
|  | 2 | 47.70 | 46.04 | 6.26 | 21 | 5.07 | −2.0~+2.6 |
|  | 3 | 45.04 | 48.03 | 6.93 | 16 | 5.04 | −3.0~+2.9 |
|  | 4 | 40.00 | 46.00 | 14.00 | 12 | 5.04 | +1.3~+8.8 |
|  | 5 | 35.00 | 60.00 | 5.00 | 8 | 4.96 | −3.9~+3.4 |
|  | 6 | 32.00 | 56.00 | 12.00 | 9 | 4.99 | +1.8~+5.9 |

Note:
I: Examples, II: Comparative Examples

As is seen from this Table, as many of Fe2O3 come near the stoichiometry, the relative permeability μi becomes larger. When CuO is increased, the rate of the temperature change of the inductance is larger. Further, when Fe2O3 is decreased and NiO is increased, the sintering is insufficient and the density is lowered.

Figure 2:
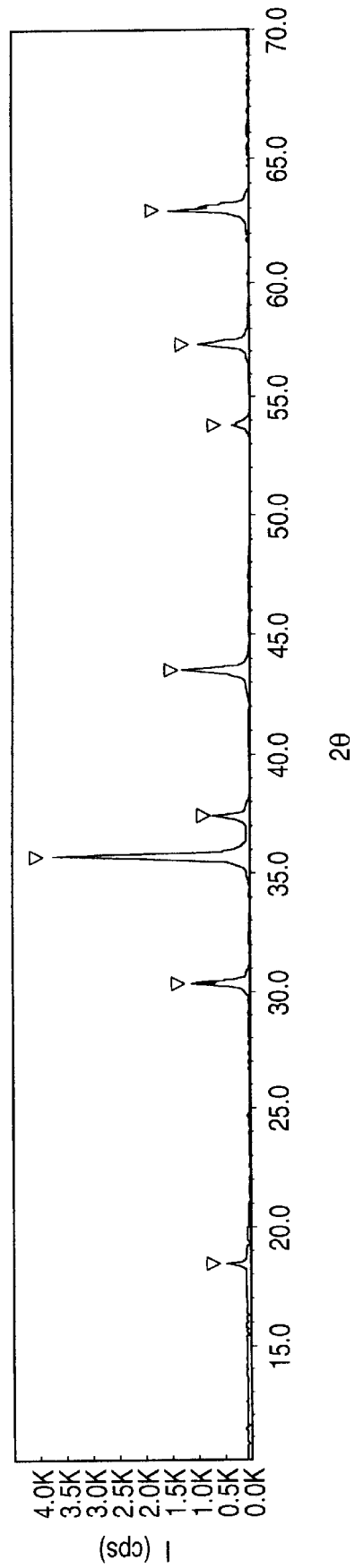
FIG. 2 is an X-ray diffraction chart of one example of the magnetic materials of the invention.

X-ray diffraction chart of the magnetic materials of Example 1 is shown in FIG. 2.

Examples 6 to 11 and Comparative Example 7 to 11

The toroidal of the magnetic material was made in the same manners in Examples 1 to 5 except changing the temperature of the real firing in the range of 870 to 930° C. The magnetic properties thereof are shown in Table 2

TABLE 2

|  |  | Ratio of components (mol %) | | | Burning temperature | Magnetic properties | | |
|---|---|---|---|---|---|---|---|---|
|  |  |  |  |  |  | Relative permeability | Density | Rate of change in inductance temperature |
| Examples | | Fe₂O₃ | NiO | CuO | (° C.) | ($\mu_1$) | (g/cm³) | (ΔL/L %) |
| I | 6 | 42.04 | 50.23 | 7.73 | 920 | 13 | 5.06 | +1.9~+4.9 |
|  | 7 | 39.41 | 52.15 | 8.44 | 880 | 9 | 5.01 | +0.1~+2.3 |
|  | 8 | 39.41 | 52.15 | 8.44 | 920 | 12 | 5.08 | +0.8~+2.9 |
|  | 9 | 39.01 | 54.68 | 6.31 | 880 | 11 | 5.03 | +1.0~+3.9 |
|  | 10 | 39.01 | 54.68 | 6.31 | 920 | 14 | 5.08 | +1.2~+4.8 |
|  | 11 | 39.00 | 50.00 | 11.00 | 920 | 13 | 5.05 | +0.6~+3.9 |
| II | 7 | 42.04 | 50.23 | 7.73 | 930 | 16 | 5.05 | +1.9~+5.8 |
|  | 8 | 39.41 | 52.15 | 8.44 | 870 | 8 | 4.99 | +0.1~+2.1 |
|  | 9 | 39.01 | 54.68 | 6.31 | 870 | 9 | 4.99 | +0.5~+3.0 |

TABLE 2-continued

|  | Ratio of components (mol %) | | | Burning temperature (° C.) | Magnetic properties | | |
|---|---|---|---|---|---|---|---|
|  | | | | | Relative permeability ($\mu_1$) | Density (g/cm$^3$) | Rate of change in inductance temperature ($\Delta L/L$ %) |
| Examples | Fe$_2$O$_3$ | NiO | CuO | | | | |
| 10 | 39.00 | 50.00 | 11.00 | 870 | 9 | 4.97 | −0.5~+2.1 |
| 11 | 39.00 | 50.00 | 11.00 | 930 | 15 | 5.09 | +0.9~+5.2 |

Note:
I: Examples, II: Comparative Examples

As is seen from this Table, when the firing temperature is less than 880° C., the sintering is insufficient, and the density is low, and when being 920° C. or more, the changing rate of the inductance temperature is large.

Example 12

100 wt part of the temporarily fired powders obtained in Example 1 is added with 7 wt part of organic vehicle (butyral resin), 5 wt part of plasticizer (diethylphalate), 3 wt part of dispersant (Hi-Tenor made by Dai-Ichi Kogyoseiyaku Sha) and 50 wt part of organic solvent (isochoric mixture of toluene, xylene and modified alcohol), charged into a polyethylene pot, and mixed for 10 hours in the ball mill by using zirconia balls of about 10 mm in diameter.

The obtained slurry is formed in sheet on a Mylar film of 75 μm thickness and 83 mm width, and then pierced with through holes in place by a laser piercing.

On the sheets, a screen process printing of the internal conductors is performed by a printing machine having a position confirming function through a CCD camera, and the printed sheets are laminated in order, and after temporarily stacking, a real pressing is performed with a metallic mold.

The obtained laminated basic plates are cut in chips with a heated knife following cutting markers on the surface of the basic plate. The cut chips are subjected to a de-binder treatment, and to the real firing at 900° C. for 2 hours.

After the real firing, the chips are performed with a barrel treatment for chamfering by a wet-ball method as a media of SiC ball of 3 mm diameter, then furnished with terminal electrodes according to an ordinary practice, plated, washed and dried. In such manners, the inductance elements may be provided having characteristics that temperature dependency of the inductance is very small, and resonance of the impedance is several 100 MHz or more.

Figure 3:
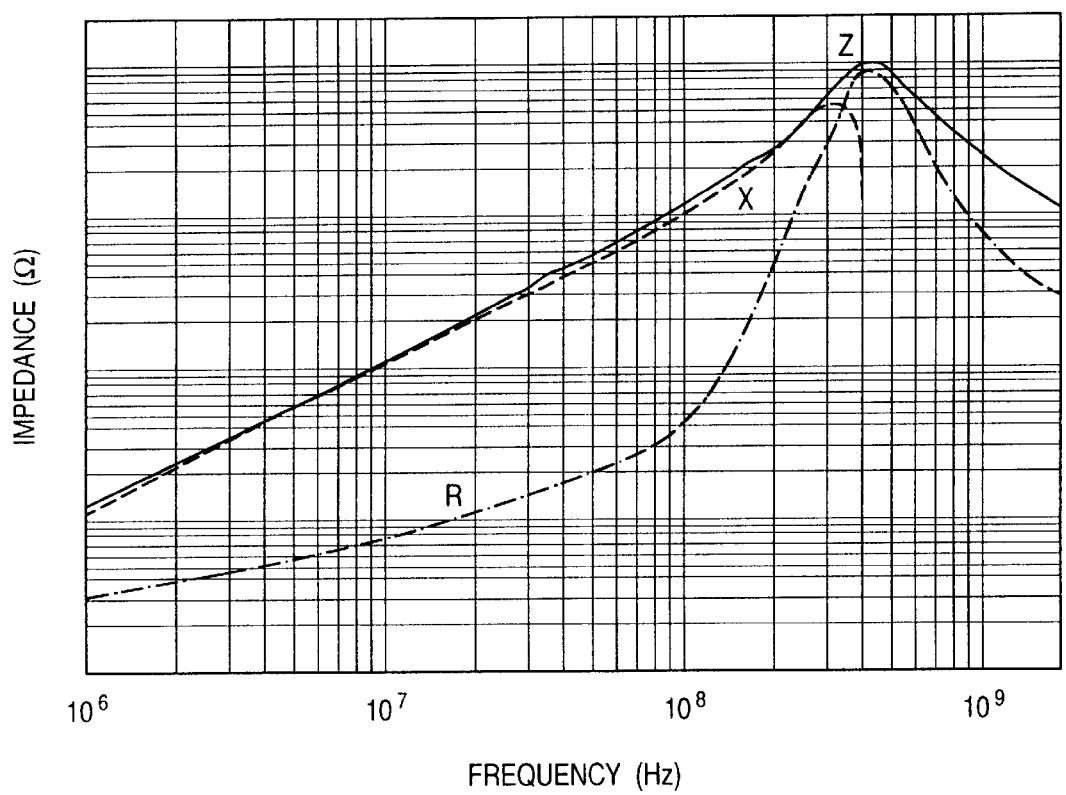
FIG. 3 is a graph showing frequency characteristics of impedance of the laminated inductance elements of the invention.

Frequency characteristics of the impedance of the inductance element are shown in FIG. 3.

The magnetic material according to the invention has advantages that the relative magnetic permeability is 15 or less, the temperature changing rate is small as within ±5%, and the firing temperature is relatively low as 880 to 920° C., so that the inventive magnetic material can be baked with silver or silver alloys concurrently.

In addition, the inductance element made with this material has merits that Rdc is markedly small and temperature stability of the inductance is high.

What is claimed is:

1. A magnetic material comprising a ceramics essentially consisting of:

iron oxide (Fe2O3) in a range from 35.0 to 44.5 mol %;

nickel oxide (NiO) in a range from 47.0 to 56.5 mol %; and copper oxide (CuO) in a range from 5.0 to 12.0 mol %, wherein said ceramics has relative magnetic permeability of 15 or less.

2. An inductance element comprising:

a magnetic material comprising a ceramics essentially consisting of iron oxide (Fe2O3) in a range from 35.0 to 44.5 mol %; nickel oxide (NiO) in a range from 47.0 to 56.5 mol %; and copper oxide (CuO) in a range from 5.0 to 12.0 mol %, said ceramics having relative magnetic permeability of 15 or less; and internal metallic conductors.

3. The inductance as set forth in claim 2, wherein the internal metallic conductor is one of silver, platinum, and their alloys.

4. A method of producing a magnetic material comprising steps of:

selecting starting materials from power of iron oxide, nickel oxide, copper oxide, iron carbonate, nickel carbonate, and copper carbonate;

mixing the starting materials;

temporary firing the produced mixture in an air at temperature of about 700° C. for 1 to 2 hours;

pulverizing the temporarily fired material into average diameter of around 0.5 to 2.0 μm and relative surface area of 5 to 8 M$^2$/g;

forming the temporary fired power into a desired shape;

real firing at 880 to 920° C. for 2 hours, wherein the respective starting materials are selected such that when each materials are calculated in terms of Fe2O3, NiO and CuO, finally Fe2O3 is 35.0 to 44 mol %, NiO is 47.0 to 56.5 mol % and CuO is 5.0 to 12.0 mol %.

5. A method of making laminated inductance elements by co-firing ceramic green sheets and internal metallic conductors, the method comprising steps of:

selecting starting materials from power of iron oxide, nickel oxide, copper oxide, iron carbonate, nickel carbonate, and copper carbonate;

mixing the starting materials;

temporary firing the produced mixture in an air at temperature of about 700° C. for 1 to 2 hours;

pulverizing the temporarily fired material into average diameter of around 0.5 to 2.0 μm and relative surface area of 5 to 8 m$^2$/g;

forming a green sheet from the temporary fired power;

laminating paste of silver or silver alloys as internal conductive layers;

co-firing the green sheet and the internal conductive layers at 880 to 920° C. for 2 hours, wherein the respective starting materials are selected such that when each materials are calculated in terms of $Fe_2O_3$, NiO and CuO, finally $Fe_2O_3$ is 35.0 to 44 mol %, NiO is 47.0 to 56.5 mol % and CuO is 5.0 to 12.0 mol %.

6. The method as set forth in claim 5, wherein metals of silver or silver alloys are silver or silver palladium alloys.

* * * * *